United States Patent [19]

Brüggen et al.

[11] Patent Number: 4,628,739
[45] Date of Patent: Dec. 16, 1986

[54] DEVICE FOR MEASURING THE PRESSURE OF A GAS LIKE MEDIUM

[75] Inventors: Gerhard Brüggen, Stuttgart; Dieter Karr, Leonberg; Wolfgang Rottler, Markgröningen; Ilan Brauer, Stuttgart, all of Fed. Rep. of Germany

[73] Assignee: Robert Bosch GmbH, Stuttgart, Fed. Rep. of Germany

[21] Appl. No.: 717,240
[22] PCT Filed: May 19, 1984
[86] PCT No.: PCT/DE84/00114
§ 371 Date: Mar. 11, 1985
§ 102(e) Date: Mar. 11, 1985
[87] PCT Pub. No.: WO85/00425
PCT Pub. Date: Jan. 31, 1985

[30] Foreign Application Priority Data
Jul. 7, 1983 [DE] Fed. Rep. of Germany ....... 3324478

[51] Int. Cl.$^4$ .............................................. G01L 11/00
[52] U.S. Cl. ...................................... 73/702; 73/32 A
[58] Field of Search ..................... 73/702, 703, 32 A

[56] References Cited
U.S. PATENT DOCUMENTS
4,535,633 8/1985 Schiess et al. ..................... 73/702

FOREIGN PATENT DOCUMENTS
2722560 12/1977 Fed. Rep. of Germany ........ 73/702
2504265 10/1982 France .................................. 73/702

Primary Examiner—Donald O. Woodiel
Attorney, Agent, or Firm—Michael J. Striker

[57] ABSTRACT

A piezoelectric device for measuring the pressure of a gas like medium comprises two oscillators disposed opposite to each other in a substantially closed system by intermediate introduction of the gas to be measured. The measuring is performed by defining a transfer factor from the first piezoelectric oscillator to the second piezoelectric oscillator, whereby the first piezoelectric oscillator is definitely excited and the measuring signal is picked up by the second piezoelectric oscillator.

8 Claims, 2 Drawing Figures

DEVICE FOR MEASURING THE PRESSURE OF A GAS LIKE MEDIUM

BACKGROUND OF THE INVENTION

The present invention is based on a device for measuring the pressure of a gas like medium in accordance with the type of the main claim. A closed system is known from DE-OS No. 31 26 615 with the assistance of which the pressure of a gas is measurable with a power manometer which acts on a piezoelectric element. This is a closed system, the accuracy of which depends to a high degree upon the tightness of the device and which in furtherance has only a limited measuring range corresponding to the deformability of the hydraulic intensifier. Furthermore, during the deflection of a hydraulic intensifier there is a nonlinear interrelation between electrical signal and pressure, whereby the measuring results may be impaired.

SUMMARY OF THE INVENTION

The device in accordance with the invention with the characterizing features of the main claim is advantageous in that with a low constructive effort a robust and exact measuring system is created. In view of its compact structure the device is particularly suitable for use in motor vehicles, whereby in view of the large measuring range different applications may be realized without additional measures. As particularly advantageous in fields of applications the measuring of the intake pressure of the gasoline-air-mixture in combustion motors in the area beneath 1 bar, the measuring of the tire pressure in the range of about 1 to 5 bar and the measuring of the gas' pressure in pneumatic brake systems where pressures in the range of 15 to 20 bar occur.

When measuring pressure with the process used here, a substantially closed system is strived for, since in a closed chamber of the inventive type the sonic pressure is proportional to the static pressure. The result is practically hardly adulterated through a thin conduit to the inlet of the gas to be measured. The device in accordance with the invention permits very rapid measurements with low measuring errors, whereby always a linear interrelation is maintained in the total measuring range to a very high degree.

Advantageous further embodiments and improvements of the device are possible. With respect to the selection of the oscillators, preferably piezo bending oscillators are suitable because the deliver a relative strong output signal in a compact structural mode, however thickness vibrators or shear vibrators are basically useable instead. When designing the device it is advantageous if, with the hollow space for the gas volume to be measured and the opening conduit, they are worked out from metallic support disks for the oscillators or that a slotted annular dis is inserted as a distance disc, whereby the slot defines the gas supply conduit. The assembly of the device can be made in a simple manner by welding along the edge of the support discs.

For eliminating aging and temperature influences on the piezoceramic elements of the measuring device, particularly an electrical compensation is suitable in such a manner that an additional reaction oscillator is provided on the same support disc as the first, selected excited oscillator, whereby the output signal of the reaction oscillator acts in the sense of a compensation for the aging and temperature influences on the output signal of the device. This can be performed immediately in that the output signal of the measuring device is represented as a quotient of the signals of the second oscillator and the reaction oscillator ($S_2/SR$); however still more simpler is a compensation circuit with a differential forming, whereby the reaction oscillation signal (SR) is fed through an amplifier and to a regulator which changes the exciting signal (S1) of the first oscillator in such a manner that the reaction oscillation signal is substantially maintained constant. Since the temperature and aging influences act in the same manner with similar oscillators, the signal of the second oscillator (S2) is also influenced in the sense of a compensation by the changes caused by the reaction oscillating signal (SR).

Further details and advantageous further embodiments of the invention are explained in more detail in the following description in conjunction with the exemplified embodiment.

DETAILED DESCRIPTION OF THE PREFERRED EMBODIMENT

Figure 1:
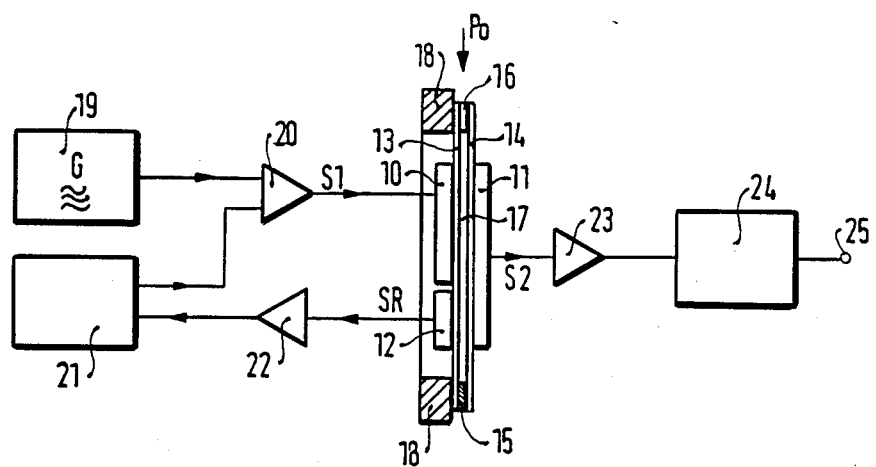
FIG. 1 schematically illustrates a section through a measuring device with compensation control.

FIG. 1 illustrates a pressure measuring device with a first bending oscillator 10, a second bending oscillator 11 and a reaction oscillator 12. The reaction oscillator 12 is formed by a sector of the first bending oscillator 10 which is provided on a first support disc 13. The second bending oscillator 11 is disposed at a distance $\leq 0.2$ mm, preferably at a distance $\leq 0.15$ mm from the first bending oscillator 10 on a second support disc 14. The distance between the bending oscillators 10 and 11 or between their support discs 13 and 14 is defined by a slotted annular disc 15 made of metal. Thus, the slot in the annular disc 15 forms a conduit 16 with a slot width of 0.03 to 0.3 mm$^2$, through which the gas to be measured reaches the inside of the device. In the illustrated pressure measuring device, the conduit 16 is designed with a length of 1 to 2 mm, so that pressure fluctuations in a hollow space 17 between the support discs 13 and 14 completely act on the second bending oscillator 11, while having a very low pressure drop to the outside. On the first support disc 13, an annular attenuation mass 18 is provided, which assists to maintain the oscillation exciting of the second bending oscillator 11 low by means of mechanical vibration. The hollow space 17 for receiving the measuring gases has a volume of 5 to 10 mm$^3$ in the illustrated pressure measuring device.

FIG. 1 further illustrates a circuit for compensation of aging and temperature influences on the bending oscillators 10 and 11. For this purpose, a sector is removed from the bending oscillator 10 as a separate reaction oscillator 12, whose output signal serves as a standard signal. The exciting of the device is performed by a sinus generator 19 with an operating frequency between 1.5 and 6 KHz, whose output signal is fed to the input of an operation amplifier 20. The control signal of a regulator 21 is applied to the other input of the operation amplifier 20, which receives as an input signal the reaction oscillator signal SR through an amplifier 22. The exciting of the first bending oscillator 10 is then performed by the output of the operation amplifier 20 through signal S1. The output signal S2 of the second bending oscillator 11 is fed through an amplifier 23 and a switch member 24 to the analog output 25 of the measuring device. The switch member substantially serves for calibrating the output signal S2 and for a range switching corresponding to the size of the output signal. A voltage can be picked up at the analog output 25 indicative of the pressure in the hollow space 17.

Figure 2:
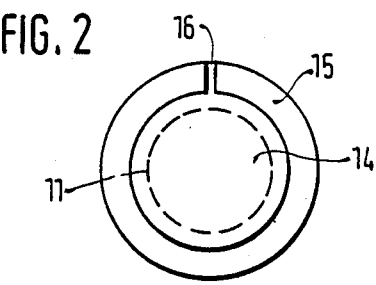
FIG. 2 is a plan view of the opened measuring device.

FIG. 2 illustrates a plan view of an opened measuring device, whereby the slotted annular slot in disc 15 and the conduit 16 formed by the slot for the passing of the measuring gas can be particularly clearly seen. The annular disc 15 is disposed on the second support disc 14 and closes flush with the same on the outside, while the second bending oscillator 11 is indicated by dotted lines.

With the device in accordance with the invention pressure measurements of gases can be performed particularly simple and cost effective. The principal mode of operation consists in that the hollow space 17 is limited by two opposite walls, one of which generates pressure fluctuations similar to an oscillating piston and the other wall measures the pressure fluctuations in the manner of a microscope. Two equal piezo-ceramics are used on both sides of the hollow space 17 in the measuring device, which are oppositely located in tight arrangement and are formed plate-like as bending oscillators 10 and 11. The first bending oscillator 10 is excited into defined oscillations by a sinus-like voltage signal; the second bending oscillator 11 is pushed by the intermediary gas buffer and oscillates passively. An oscillating proportional voltage signal S2 is then picked up from the piezo-ceramic of the second bending oscillator 11. The arrangement is open through conduit 16 and therefore safe against overloading. Since the hollow space 17 is in contact with the measuring gas through conduit 16, the measured pressure fluctuations are proportional to the measure gas pressure outside of the hollow space when the surface of the first bending oscillator 10 oscillates with a constant amplitude.

The size of the piezo-ceramic bending oscillators 10 and 11 define the size of the pressure sensor. In the exemplified embodiment bending oscillators 10 and 11 are used with a ceramic diameter of 8.5 mm and an outer diameter of the support discs 13 and 14 of 12.5 mm, which simultaneously define the outer diameter of the total device. The exciting by the sinus generator 19 was performed in the frequency range between 1.5 and 6 KHz, whereby tests were performed in the vacuum range between 0.2 and 1 1 bar. In this pressure range a very good linearity was obtained with an error $<2\%$ from the initial pressure of 1 bar. However, the pressure measuring device is not limited to this pressure range, since as a partially open system it is safe from overloading so that it could be used for given higher pressures. The quickness of the system for pressure measuring used in the tests had a limit frequency of about 60 Hz, which however can be adjusted over the cross section of conduit 16.

In the illustrated measuring device the conduit 16 is very tight, so that in the first approximation there was no pressure balance through conduit 16 during the measuring process. Thereby, the pressure chamber in form of hollow space 17 has a constant face at the exciting face, which in turn oscillates with a constant amplitude. The volume of the hollow space 17 is periodically varied by the movement of the bending oscillator 10, whereby the static pressure $P_o$ of the measuring gas also prevails in hollow space 17. The volume change by the movement of the bending oscillator 10 effects a changeable alternating pressure with the frequency of generator 19, which is measured with the second bending oscillator 11. Since the reflecting surface of the first bending oscillator 10, the volume of the hollow space 17 and the amplitude of the first bending oscillator 10 are all constant, the alternating pressure is proportional to the static pressure $P_o$, so that the measuring of the alternating pressure on the second bending oscillator 11 can be used for determining the static pressure in hollow space 17. The pressure balance through a small conduit 16 can be disregarded for the measuring result, however there is a displacement of the linear operating range with respect to the higher amplitude, if the cross section of conduit 16 is increased. With a cross section of conduit 16 of 0.03 mm$^2$, a limit frequency for the measurable pressure change of 60 Hz was obtained. A too short length of the conduit 16 resulted in a slight expanding of the pressure transmission function due to the low flow resistance, so that the coupling of the second bending oscillator 11 is therefore less. When changing the distance between the bending oscillators 10 and 11 it had been found that above a distance of about 0.2 mm the exciting of the second bending oscillator 11 had been reduced by the gas buffer, while the exciting through mechanical vibration coupling became noticeable. Moreover, the attenuation reduced with increasing distance between the bending oscillators 10 and 11 and more self oscillations occurred on bending oscillator 11. A distance of $<0.15$ mm has been shown to be the most favorable distance in the described device.

Moreover, the type of mounting for the bending oscillators became noticeable to the exciting of the gas buffer. The mechanical coupling can be reduced by means of the type of mounting. Thereby, the material of the annular disc 15 plays a role. Annular discs made of metal have been shown to be successful in long time tests, since in short time tests advantageous annular discs 15 made of paper or plastic did not prove to be stable for a long time. Annular discs 15 made of metal have the further advantage that the manufacturing of the device becomes particularly simple by directly welding the support discs 13 and 14 together with annular disc 15. The arrangement of the support discs 13 and 14 and the annular disc 15 is advantageously welded to the ring which acts as attenuation mass 18, which then is a part of the mounting which is not shown.

For the technical use of the measuring device, in particular in a motor vehicle, temperature fluctuations in the range of $-20°$ C. to $+80°$ C. must be controllable. Such strong temperature fluctuations are not without any influence without special measures, since the change factor of the piezo-ceramic is subject to temperature and aging influences. Piezo-ceramics are commerically available, which are subjected to temperature and aging influences to a lesser degree, however these influences cannot be disregarded in difficult operating conditions. An advantageous electrical circuit for the compensation of the aging and temperature conditions is schematically illustrated in FIG. 1. The first bending oscillator 10 is mechanically coupled with the reaction oscillator 12 and is connected into the electronic circuit in such a manner that the transmitter bending oscillator 10 is admitted with the controlled signal S1 in such a manner that the constant voltage signal SR is always provided on the reaction oscillator. Thus, the aging and temperature influence of the piezo-ceramic is neutralized, because both influences act on the ceramic of the reaction oscillator 12 as well as on the receiver ceramic of bending oscillator 11. The regulator 21 performs a slow moving proportion control, whereby the operation amplifier 20 is so controlled that the output signal S1 of the operation amplifier 20 is increased, while the signal SR becomes smaller.

It will be understood that each of the elements described above, or two or more together, may also find a useful application in other types of devices for measuring gas pressures differing from the types described above.

While the invention has been illustrated and described as embodied in a device for measuring gas pressure, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Device for measuring the pressure of a gas-like medium by means of a piezoelectric measuring device, comprising two piezoelectric oscillators (10,11) disposed opposite each other and spaced from each other to define a hollow space therebetween, said piezoelectric oscillators being arranged in a substantially closed system into which a gas to be measured is introduced and wherein a first oscillator (10) is excited and a second oscillator (11) is coupled to the first oscillator (10) by means of a gas buffer which is contained in said hollow space (17) between the oscillators (10,11) and causes said second oscillator (11) to oscillate passively; a conduit (16) connecting said hollow space with a remaining gas being measured ($P_o$); and a reaction oscillator (12) mechanically connected to the first oscillator (10) so that an exciting signal (SR) of said reaction oscillator is applied to and acts at least indirectly on the oscillators (10,11) and on an output signal (S2) of said second oscillator so as to compensate for aging and temperature influences in said closed system.

2. Device in accordance with claim 1, wherein the oscillators (10,11) are disc-like piezo-ceramic bending oscillators.

3. Device in accordance with claim 2, wherein metallic support discs (13,14) are provided which support said oscillators (10,11,12) thereon, said support discs being spaced from each other so that the hollow space (17) for a gas volume to be measured and the conduit (16) are worked out of said metallic support discs (13, 14) of oscillators (10, 11, 12).

4. Device in accordance with claim 3, wherein the support discs (13, 14) are spot welded to each other at edges thereof.

5. Device in accordance with claim 2, and further including a slotted metallic annular disc (15), said hollow space (17) for a gas volume to be measured and the conduit (16) being formed at said metallic annular disc.

6. Device in accordance with claim 1, wherein the hollow space (17) for the measuring gas ($P_o$) has a volume of about 5 to 10 mm$^3$ and the conduit (16) has a cross section of about 0.03 to 0.3 mm$^2$ at a distance formed by the oscillators (10, 11) $\leq$0.20 mm and has a conduit length of about 1 to 2 mm.

7. Device in accordance with claim 1, and further including a first amplifier (22) receiving said exciting signal of the reaction oscillator (SR), a regulator (21) connected to said first amplifier; and a second amplifier (20) connected to said regulator and to said first oscillator and operated to amplify the exciting signal (S1) of said first oscillator when said reaction oscillator exciting signal (SR) is reduced in such a manner that the reaction oscillator exciting signal (SR) is maintained constant.

8. Device in accordance with claim 7, and further including a sinus generator connected to said second amplifier (20) so that the exciting signal (S1) of the first oscillator (10) is a sinus like signal.

* * * * *